United States Patent [19]

Fleming

[11] Patent Number: 4,751,211

[45] Date of Patent: Jun. 14, 1988

[54] COMPOSITE ADSORBENT FOR REMOVING ACIDS FROM ORGANOPHOSPHATE FUNCTIONAL FLUIDS

[75] Inventor: Hubert L. Fleming, Mars, Pa.

[73] Assignee: Aluminum Company of America, Pittsburgh, Pa.

[21] Appl. No.: 894,257

[22] Filed: Aug. 7, 1986

[51] Int. Cl.$^4$ .............................................. B01J 29/08
[52] U.S. Cl. ........................................ 502/64; 502/79
[58] Field of Search ................................... 502/64, 79

[56] References Cited

U.S. PATENT DOCUMENTS

| | | | |
|---|---|---|---|
| 3,025,233 | 3/1962 | Figert | 210/502 |
| 3,181,231 | 5/1965 | Breck | 502/79 |
| 3,764,563 | 10/1973 | Minachev et al. | 502/64 |
| 3,899,310 | 8/1975 | Chi et al. | 55/71 |
| 3,917,544 | 11/1975 | Michel | 252/455 Z |
| 4,402,883 | 9/1983 | Anzenberger | 260/990 |

FOREIGN PATENT DOCUMENTS 1491563  11/1977  United Kingdom .

Primary Examiner—Carl F. Dees
Attorney, Agent, or Firm—Glenn E. Klepac

[57] ABSTRACT

A composite adsorbent useful for reducing the acidity and moisture content of used organophosphate functional fluids. The adsorbent is a powder having an average particle size of about 20–500 microns and total pore volume of at least about 0.40 cm$^3$/g and it comprises about 40–90 wt % alumina and about 10–60 wt % Y zeolite wherein the molar ratio of SiO$_2$ to Al$_2$O$_3$ is about 4.5–6.0. The adsorbent is preferably produced by agglomerating particles of activated alumina and Y zeolite into a composite agglomerate, aging the agglomerate and then comminuting to form a powder.

17 Claims, 6 Drawing Sheets

COMPOSITE ADSORBENT FOR REMOVING ACIDS FROM ORGANOPHOSPHATE FUNCTIONAL FLUIDS

PENDING RELATED PATENT APPLICATION

This application is related to pending U.S. application Ser. No. 795,907, filed Nov. 7, 1985.

FIELD OF THE INVENTION

The present invention relates to a solid composite adsorbent that is useful for reducing acidity and moisture content in used organophosphate functional fluids.

BACKGROUND OF THE INVENTION

A large variety of lubricants and hydraulic fluids contain triaryl phosphates. These compounds are relatively stable so that the phosphate ester fluids have long service life. However, over long periods of time organophosphate fluids undergo chemical degradation accompanied by higher acid content. Such increased acidity may eventually lead to systemic corrosion.

Numerous methods have been devised for reclaiming used organophosphate functional fluids. However, each of the prior art methods suffers from one or more serious limitations making it less than entirely suitable for its intended purpose.

Anzenberger U.S. Pat. No. 4,402,883 describes a method for reducing acidity in used organophosphate functional fluids. The method comprises contacting a used fluid with any of several types of activated alumina, returning treated fluid to the system for reuse, and subsequently regenerating the activated alumina.

In the prior art, various molecular sieves other than Y zeolite have been used as adsorbents for acids. However, these adsorbents have poor adsorption kinetics and adsorption capacities. In addition, they are expensive and can be chemically degraded by the acids. Pure Y zeolites are particularly unsuitable for use as acid adsorbents because they are so readily attacked.

Some patents disclosing adsorbents based upon combinations of alumina and molecular sieves include Figert U.S. Pat. No. 3,025,233: Chi et al U.S. Pat. No. 3,899,310; Michel U.S. Pat. No. 3,917,544; and Podschus British Patent No. 1,491,563. None of these patents discloses the composite adsorbent comprising alumina and Y zeolite that is claimed herein or the use of such adsorbent for adsorbing acids from organophosphate functional fluids.

It is a principal objective of the present invention to provide an effective solid adsorbent for reducing acidity and moisture content in used organophosphate functional fluids.

A related objective of the invention is to provide a method for producing the novel solid composite adsorbent.

Another objective of the invention is to provide a method for reducing the acidity of used organophosphate functional fluids, utilizing the novel solid adsorbent.

Additional objects and advantages of the invention will become apparent to persons skilled in the art from the following specification and claims.

SUMMARY OF THE INVENTION

In accordance with the present invention, there is provided a composite adsorbent for reducing the acidity and moisture content of used organophosphate functional fluids. The adsorbent comprises a powder having an average particle size of about 20-500 microns and total pore volume of at least about 0.40 cm$^3$/g. The adsorbent also comprises about 40-90 wt % alumina and about 10-60 wt % Y zeolite wherein the molar ratio of $SiO_2$ to $Al_2O_3$ is about 4.5-6.0.

The adsorbent is preferably produced by admixing particles of activated alumina and Y zeolite, agglomerating the particles into a composite agglomerate, aging said agglomerate in the presence of water, activating said agglomerate at an elevated temperature and comminuting said agglomerate to form a powder having an average particle size of about 20-500 microns. The activated alumina is prepared by sizing alumina to an average particle size of about 10 microns or less, and then rapidly activating the sized alumina particles by exposure to an elevated temperature of greater than about 300° C. for less than one minute, thereby to form activated alumina particles having an LOI (hydroxyl content determined by drying at 400° C. and then heating at 1100° C.) of about 6-10 wt %.

The activated alumina particles preferably have an average particle size of about 3-7 microns. Average particle sizes of about 4.5-5.0 microns are particularly preferred. The alumina and zeolite particles preferably each have a narrow particle size distribution in order to produce a composite adsorbent having increased porosity.

The Y zeolite particles are preferably sodium Y zeolite although other forms of Y zeolite may be employed on a less preferred basis. Such other forms include hydrogen, calcium, strontium, cesium and cerium Y zeolites. As used herein, the term "sodium Y zeolite" refers to the synthetic, crystalline, zeolitic, sodium aluminosilicate that is disclosed in Breck U.S. Pat. No. 3,130,007, issued Apr. 21, 1964. The disclosure of said patent is incorporated herein by reference to the extent not inconsistent with the present invention.

The Y zeolite preferably comprises crystalline particles that are at least about 95% crystalline, as measured by the method described in ASTM D-3906. Affinity of the composite adsorbent for acids is increased when the zeolite possesses greater crystallinity. The Y zeolite preferably has a molar ratio of $SiO_2$ to $Al_2O_3$ of about 4.5-6.0. A preferred molar ratio of $SiO_2$ to $Al_2O_3$ in the Y zeolite is about 4.8-6.0. The Y zeolite particles should have an average ultimate crystal size of less than about 5 microns.

The Y zeolite preferably is sodium Y zeolite having $Na_2O$ content of at least about 12.7 wt %. The sodium Y zeolite should have a sufficiently low content of sodium silicate that a 20 wt % aqueous slurry of the particles (on a hydrated or "as is" basis) has a pH of less than about 10.42. Excessive sodium silicate content deactivates the zeolite by causing it to convert to a sodium aluminosilicate glass upon activation and by blocking pores in the zeolite cage structure.

The adsorbent usually comprises about 50-80 wt % alumina and about 20-50 wt % Y zeolite, preferably about 70-80 wt % alumina and about 20-30 wt % Y zeolite. A particularly preferred adsorbent comprises about 75 wt % alumina and about 25 wt % Y zeolite. Proportions of zeolite and alumina are calculated on an oxide or dehydrated basis.

The step of agglomerating the activated alumina particles with Y zeolite typically comprises a ball forming process. This step results in formation of composite agglomerates usually having about 30-40 wt % water content.

The composite agglomerates are aged in the presence of water preferably at pH greater than 7 and at a temperature of about 0°-60° C. Aging for about 2-4 hours at about 30° C. is particularly preferred. Aging at excessive temperatures or for unduly long times causes hydrothermal decomposition of the agglomerates.

The aged agglomerates are desirably tunnel activated in a roll kiln wherein the agglomerates reach final temperature of about 450° C. Activation temperatures of about 420°-550° C. are satisfactory, with 425°-480° C. temperatures being particularly suitable.

The activated composite agglomerates generally have an LOI of less than about 6.0 wt % and greater than about 200 m$^2$/g surface area. All surface areas are measured by a single point nitrogen BET technique. Surface areas greater than about 300 m$^2$/g are preferred and surface areas greater than about 400 m$^2$/g are particularly preferred. Surface area of about 400-450 m$^2$/g is typical.

The composite adsorbent preferably has total pore volume of at least about 0.60 cm$^3$/g, at least two-thirds of which comprises macropores (average pore size greater than about 30 Angstroms). The remainder of the pore volume constitutes micropores (average pore size less than about 30 Angstroms). A particularly preferred adsorbent has total pore volume of about 0.70 cm$^3$/g, about 0.60 cm$^3$/g macropores and about 0.10 cm$^3$/g micropores. The high proportion of macropores in the composite adsorbent is advantageous because it improves kinetic adsorption capacity by lowering the amount of functional fluid trapped within tiny micropores at any given time during an adsorption cycle.

The composite adsorbent preferably has an average particle size of about 20-500 microns, more preferably about 50-200 microns. Significantly larger particle sizes are generally avoided because of their adverse effect on adsorption kinetics. Significantly smaller particle sizes are less useful because they increase pressure drops in fluid systems. A particularly preferred adsorbent has −48+100 mesh size (Tyler sieve series) with average particle size of about 100 microns.

The adsorbent also has high resistance to attrition. Adsorbents having lower attrition resistance are more difficult to employ on-line in turbines, compressors, and other apparatus containing hydraulic fluids because of their increased tendency to form fine abrasive particles.

DETAILED DESCRIPTION OF A PREFERRED EMBODIMENT

One of the starting materials for the preferred composite adsorbent of the present invention is an unground hydrated alumina having an average particle size of about 75 microns or larger. One suitable alumina is sold by Aluminum Company of America under the designation of C-30 and has an average particle size of approximately 100 microns. This material should be ground to an average particle size of about 10 microns or less before it is activated. Any grinding technique known to those skilled in the art may be used. The ground alumina has an average particle size of about 3-7 microns, preferably about 4.5-5 microns. The alumina and zeolite particles preferably each have a narrow particle size distribution in order to produce a composite adsorbent having increased porosity.

Once the alumina has a desired particle size, it is rapidly activated by exposure to high temperature for a brief period of time. Methods for such rapid activation are well known in the art. One technique which has been found to be particularly useful is described in Saussol U.S. Pat. No. 2,915,365. The disclosure of such patent is incorporated herein by reference to the extent not inconsistent with the present invention. In accordance with this technique, alumina trihydrate is injected into a stream of highly heated gases (e.g. air) at gas temperatures of greater than 300° C., such as 300°-1,000° C., with 300°-400° C. being the preferred range. The duration of contact between the alumina trihydrate and the hot gas may be less than one minute, such as from a fraction of a second to several seconds, with the preferred contact time being about one second.

The alumina, once activated, is an amorphous transition alumina. If the hydrate were not ground prior to rapid activation, crystalline boehmite would be present in the activated powder. The presence of boehmite is undesirable because it increases the hydroxyl content (indicated by LOI) of the activated alumina. These particles generally have about 6-10 wt % LOI with about 8-9 wt % being typical.

The other starting material, crystalline sodium Y zeolite, must generally be initially deagglomerated into particles having an average size of about 3-5 microns. Particles smaller than about 1-2 microns are undesirable because electrostatic effects cause them to agglomerate. Larger particles are avoided because they are more difficult to ball form when mixed with activated alumina.

The Y zeolite should have a molar ratio of SiO$_2$ to Al$_2$O$_3$ of about 4.8-6.0. When this ratio is less than about 4.5, the resulting adsorbent has reduced thermal stability. The Y zeolite is desirably more than about 95% crystalline. In other words, the material is less than about 5% amorphous as measured by X-ray diffraction.

Sodium content of the sodium Y zeolite (measured as Na$_2$O) is desirably at least about 12.7 wt % and preferably at about the maximum theoretical level. Sodium silicate content should be sufficiently low that a 20 wt % aqueous slurry of the zeolite particles has a pH of less than about 10.42. Particles producing aqueous slurries having a pH of greater than about 10.5 are unsuitable for practicing the present invention. The particles should have an ultimate crystal size of less than about 5 microns. Particles having an ultimate crystal size below about 3.5 microns are particularly suitable.

In a particularly preferred embodiment, about 75 wt % of the activated alumina and about 25 wt % Y zeolite are mixed together and ball formed (agglomerated) in the presence of water and then exposed to steam. The resulting agglomerates containing abut 30-40 wt % water are then aged at about 30° C. for about 3-4 hours. Aging is performed at a pH of greater than 7. It is undesirable to perform the aging step at greater than 80° C. in order to avoid boehmite formation in the alumina phase and sodium silicate formation in the zeolite phase.

The aged agglomerates are tunnel activated in a roll kiln that is divided into four zones having increasing temperature. After about 2 hours, the agglomerates reach a final temperature of about 450° C. The agglomerates are then removed from the kiln and cooled.

The ball formed agglomerates may have diameters ranging from about 1/16 inch to about ¼ inch. A preferred diameter is about 1/16 inch. Bulk density is about 35–60 lb/ft³.

A particularly preferred adsorbent is made by crushing 1/16 inch spherical agglomerates and sieving to obtain the 48–100 mesh size (Tyler series). Average particle size is approximately 100 microns and bulk density is about 30–45 lb/ft³ Attrition resistance is preferably less than about 0.2 wt %. Comparative properties of the composite adsorbent and a prior art adsorbent (F-1 grade activated alumina) are shown in the following Table.

TABLE 1

| Typical Adsorbent Physical Properties | | |
|---|---|---|
| | Composite Adsorbent | F-1 Alumina |
| Surface Area (m²/g) | 420 | 250 |
| Total Pore Volume (cm³/g) (<30 Angstroms) | 0.10 | 0.18 |
| Macropore Volume (cm³/g) (>30 Angstroms) | 0.60 | 0.12 |
| Crushing Strength (lb) | 16.0 | 8.0 |
| Abrasion Loss (wt %) | 0.1 | 1.5 |
| Optimum Size Cut (48–100 mesh) | >97 wt % | >94 wt % |

Figure 1:
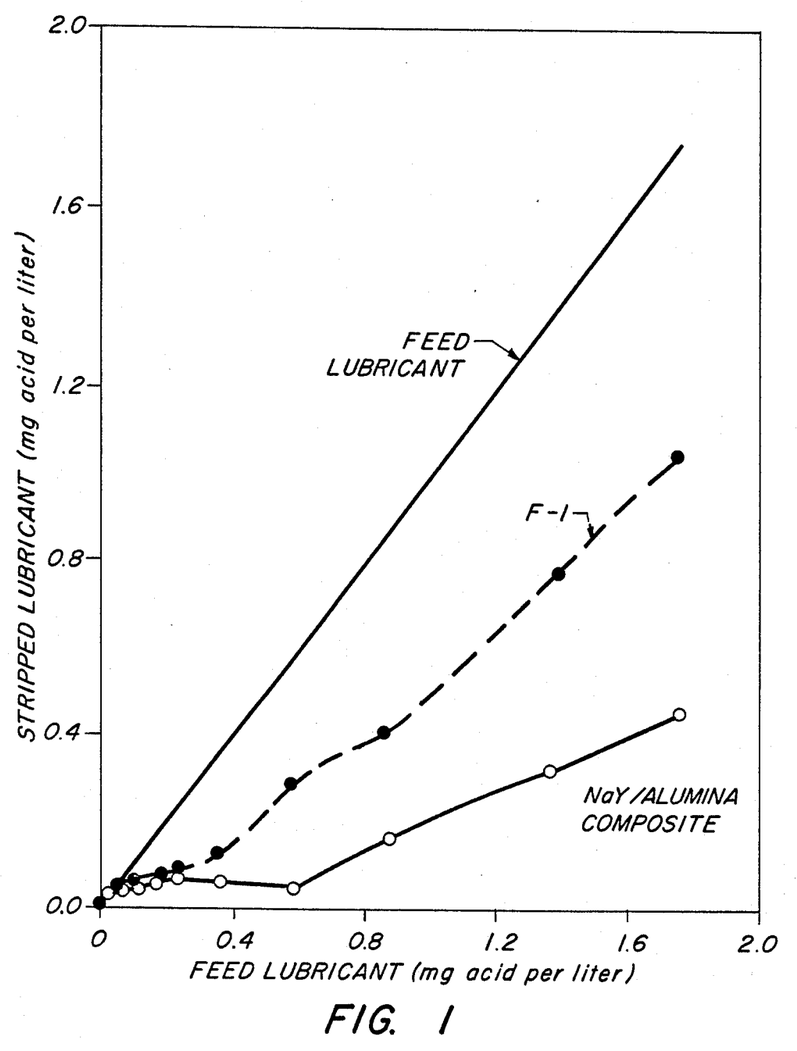
FIGS. 1 and 2 are graphs comparing adsorption capacity of the composite adsorbent of the present invention with a prior art adsorbent.

The composite adsorbent of the present invention possesses increased static and dynamic capacity for adsorption of acids and water from used organophosphate functional fluids compared with activated alumina. FIG. 1 is a graph showing stripped lubricant acid content as a function of feed lubricant acid content. Measurements were performed by exposing 100 ml samples of a t-butyl-phenyl/phenylphosphate functional fluid to 10 grams of F-1 grade alumina and NaY/alumina adsorbents at 60° C., then determining acidity levels by the method of ASTM D-974. The functional fluid is sold by Stauffer Chemical Co. of Westport, Conn., under the trade designation "Fyrquel GT".

Figure 2:
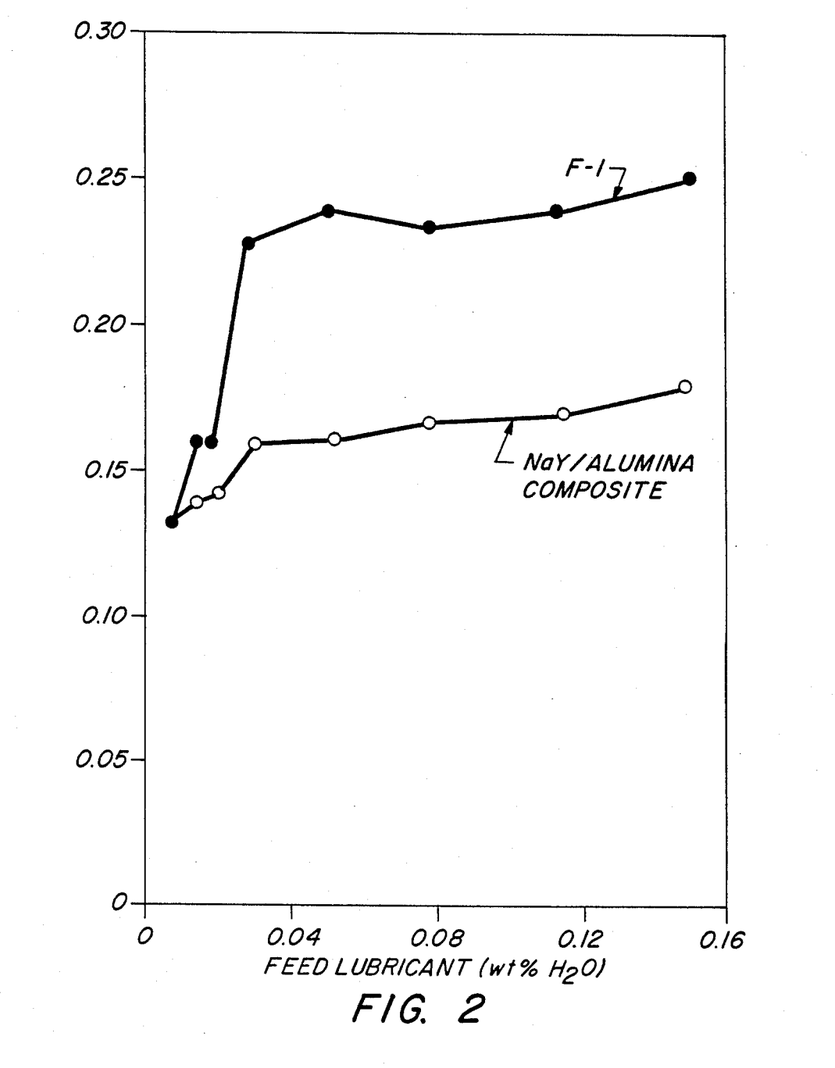

FIG. 2 is a graph showing stripped lubricant water content as a function of feed lubricant water content using F-1 grade alumina and the NaY/alumina agglomerate adsorbent of the present invention. Measurements were made by exposing 100 ml samples of a t-butylphenyl/phenylphosphate functional fluid to 10 grams of F-1 grade alumina and NaY/alumina composite adsorbents at 60° C., then determining water content in the lubricant.

Figure 3:
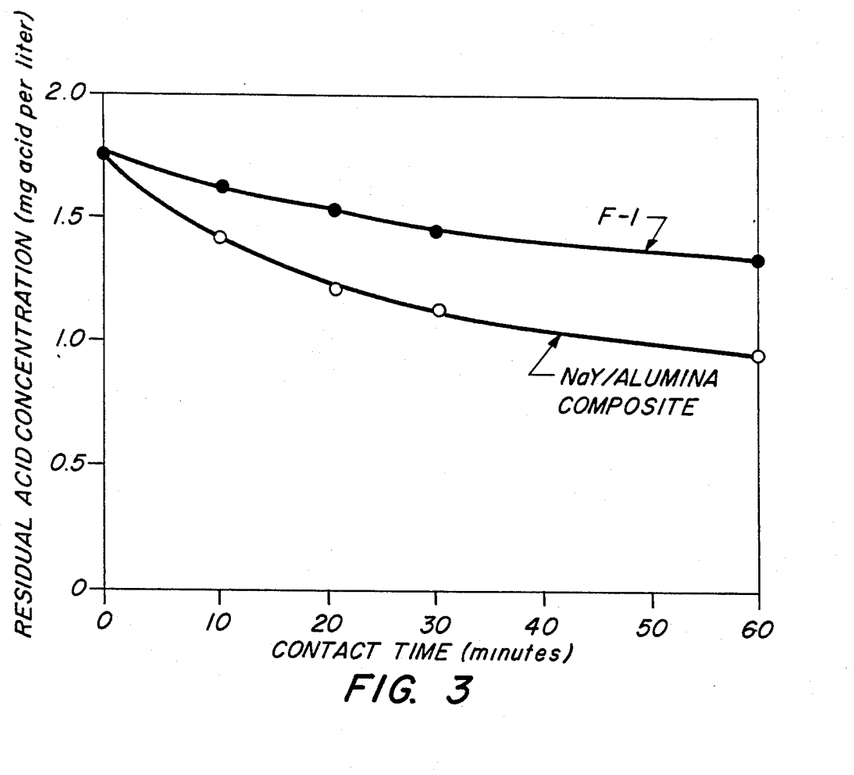
FIGS. 3, 4, 5, and 6 are graphs comparing kinetic adsorption behavior of the composite adsorbent of the present invention with a prior art adsorbent.
Figure 4:
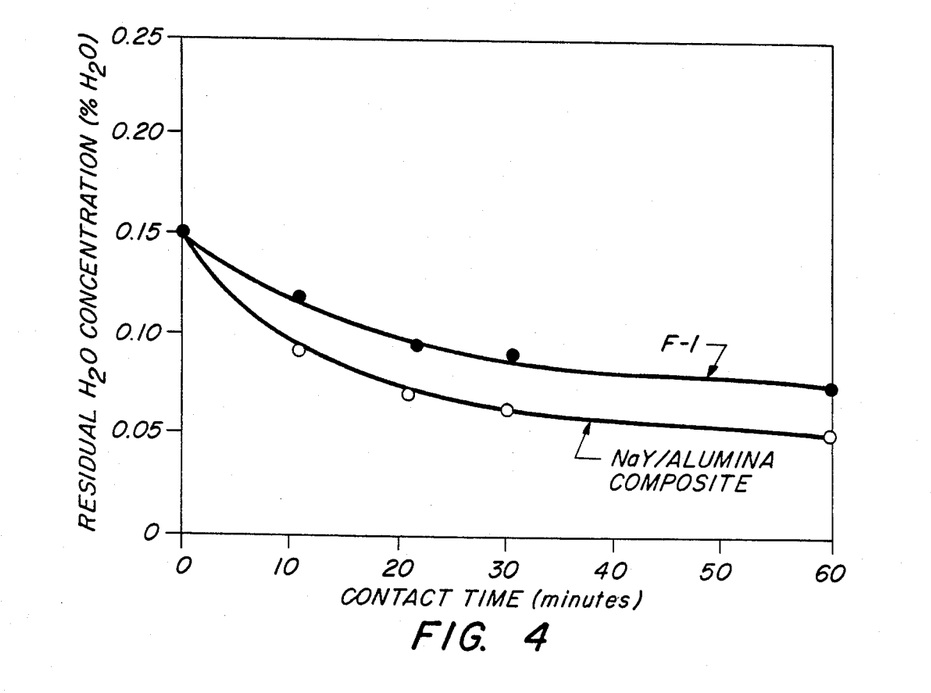

FIGS. 3 and 4 are graphs showing kinetic adsorption behavior of the composite adsorbent and F-1 grade alumina for acids and water. Measurements were made on 100 ml samples of functional fluid exposed to 10 grams of the adsorbents.

Figure 5:
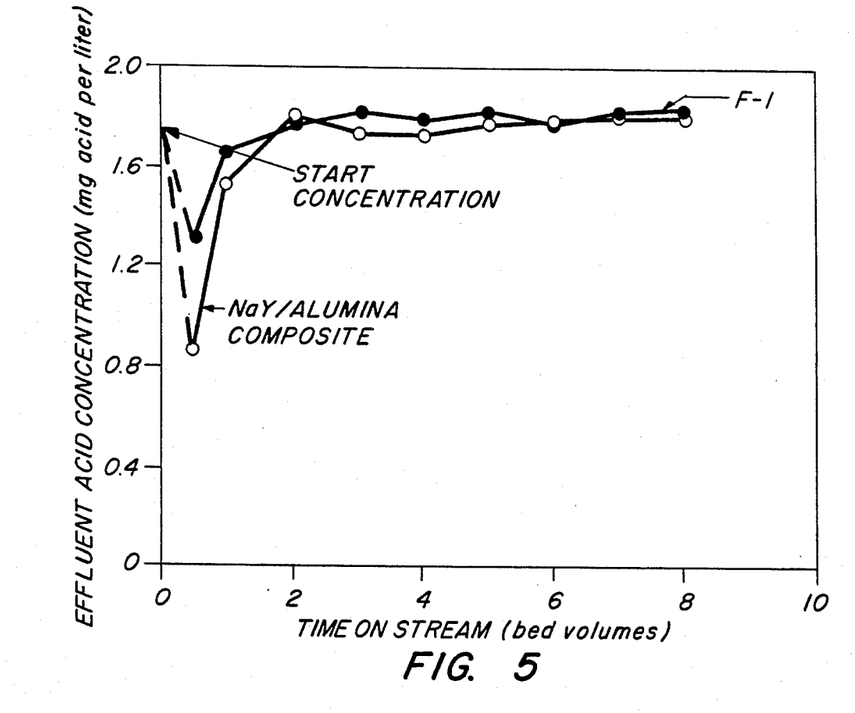
Figure 6:
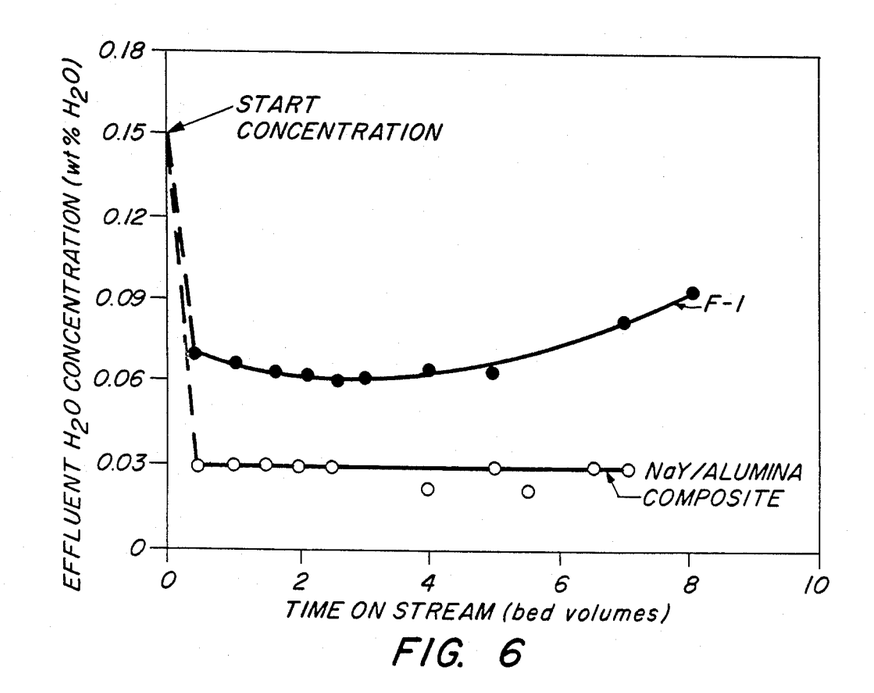

FIGS. 5 and 6 are graphs showing column dynamic adsorption behavior for the composite adsorbent and F-1 grade alumina. Measurements were made after a single pass through a column loaded with the adsorbent at 20° C.

Figure 7:
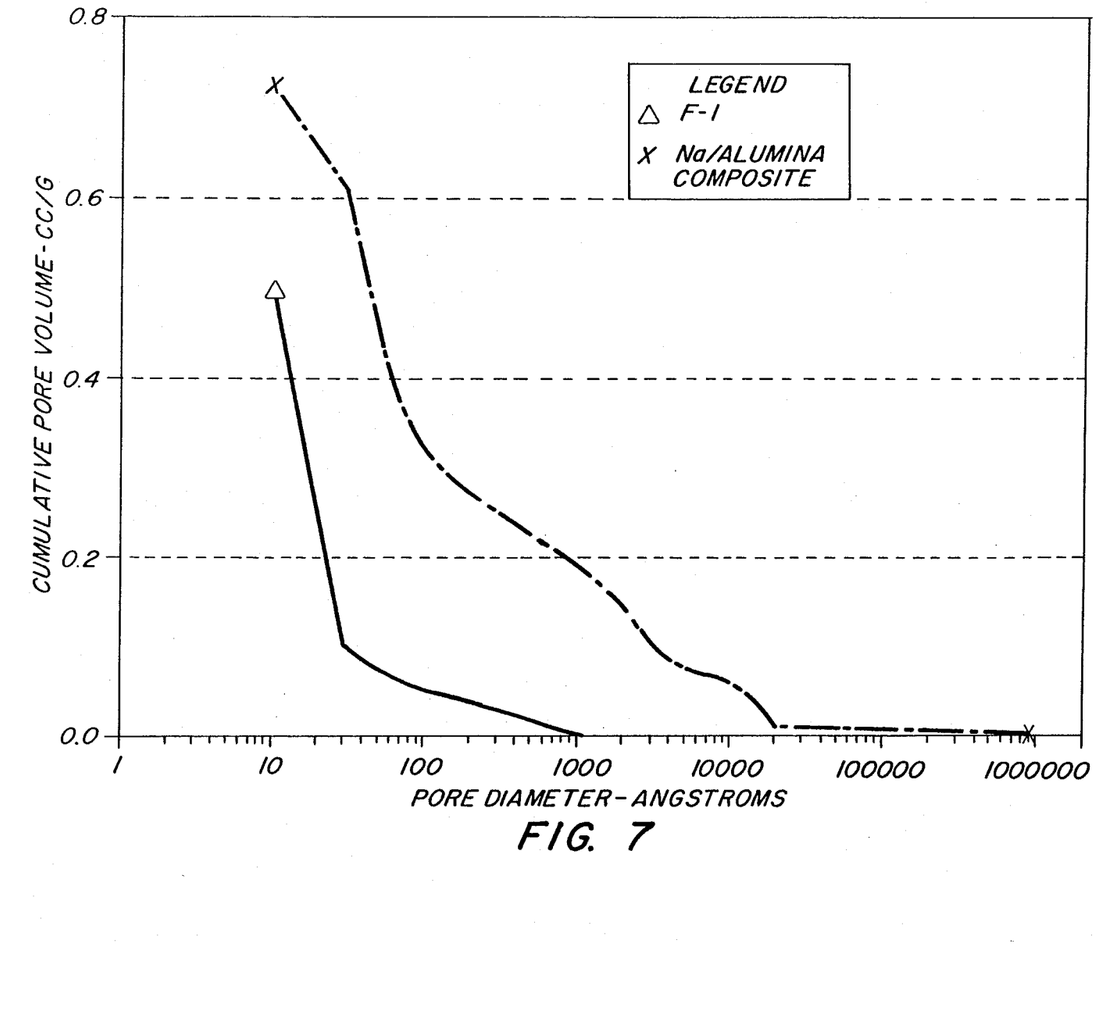
FIGS. 7 and 8 are graphs showing pore size distribution of the composite adsorbent of the present invention and a prior art adsorbent.
Figure 8:
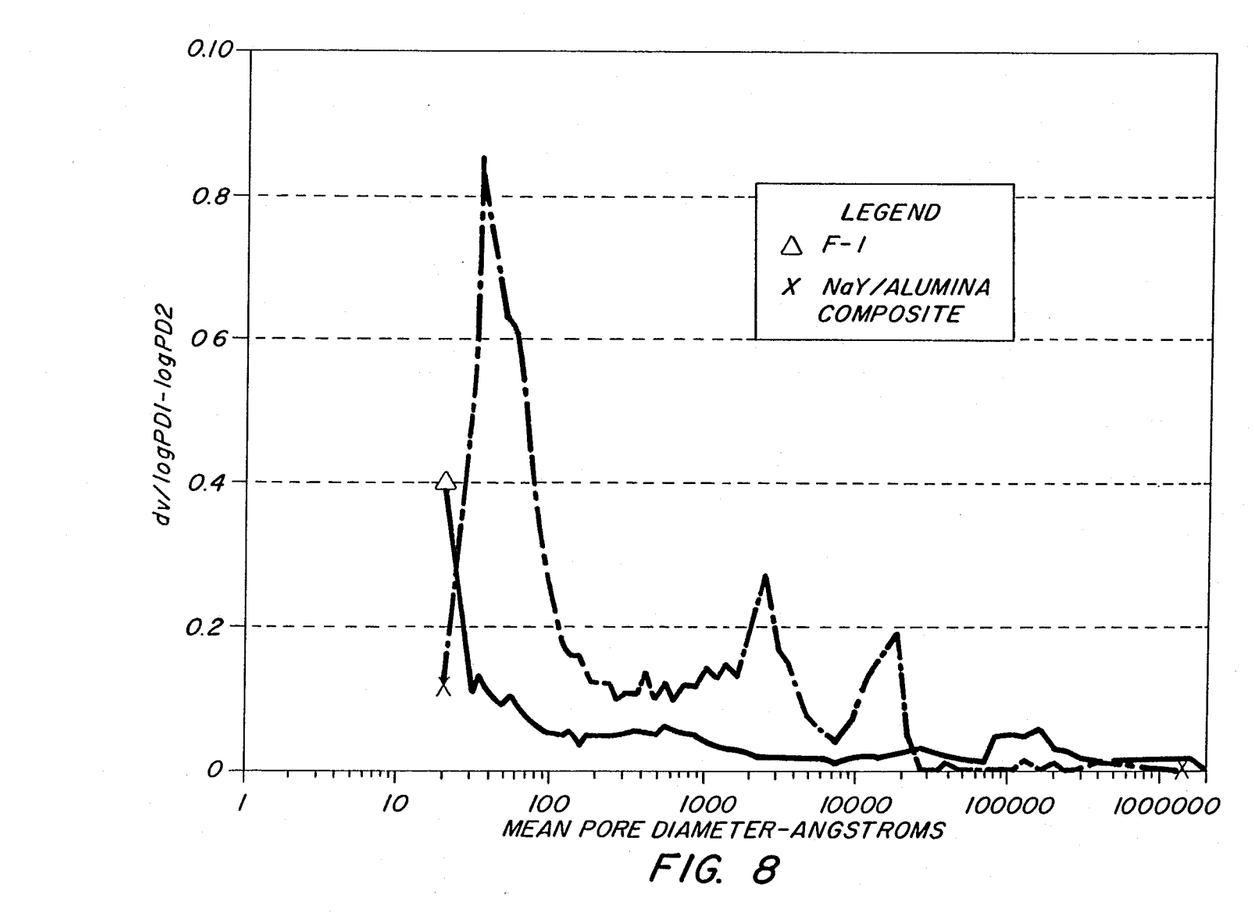

FIG. 7 is a graph showing cumulative pore volume as a function of pore diameter for the composite adsorbent and F-1 grade activated alumina. FIG. 8 is a graph showing differential pore size distribution as a function of mean pore diameter. These graphs show that the composite adsorbent contains both increased total pore volume and significantly higher macropore volume compared with F-1 grade activated alumina. Both properties are thought to be related to improved adsorption kinetics.

While the invention has been described in terms of preferred embodiments, the claims appended hereto are intended to encompass all embodiments which fall within the spirit of the invention.

What is claimed is:

1. In a composite adsorbent useful for reducing the acidity and moisture content of used organophosphate functional fluids, said adsorbent having total pore volume of at least about 0.40 cm³/g and comprising
   (a) alumina, and
   (b) Y zeolite wherein the molar ratio of $SiO_2$ to $Al_2O_3$ is about 4.5–6.0;
the improvement wherein said adsorbent is produced by admixing about 40–90 wt % alumina particles and about 10–60 wt % Y zeolite particles, agglomerating the particles into a composite agglomerate, aging said agglomerate in the presence of water at a temperature not greater than about 60° C., and then comminuting said agglomerate into a powder having an average particle size of about 20–500 microns.

2. The composite adsorbent as claimed in claim 1 wherein said alumina particles are particles of activated alumina.

3. The composite adsorbent as claimed in claim 2 having a total pore volume at least about 0.60 cm³/g, at least about two-thirds of said pore volume comprising macropore volume.

4. The composite adsorbent as claimed in claim 2 comprising about 50–80 wt % alumina and about 20–50 wt % Y zeolite.

5. The composite adsorbent as claimed in claim 2 comprising about 70–80 wt % alumina and about 20–30 wt % Y zeolite.

6. The composite adsorbent as claimed in claim 2 having a surface area of greater than about 300 m²/g.

7. The composite adsorbent as claimed in claim 2 wherein the activated alumina particles have an average particle size of about 3–5 microns.

8. The composite adsorbent as claimed in claim 2 wherein said Y zeolite comprises sodium Y zeolite.

9. The composite adsorbent as claimed in claim 8 wherein the sodium Y zeolite particles have a sufficiently low content of sodium silicate that a 20 wt % aqueous slurry of said particles has a pH of less than about 10.42.

10. The composite adsorbent as claimed in claim 8 wherein the sodium Y zeolite particles have an average particle size of about 10 microns or less and sodium content (measured as $Na_2O$) of at least about 12.7 wt %.

11. The composite adsorbent as claimed in claim 8 wherein the sodium Y zeolite particles have an average particle size of about 10 microns or less and are at least about 95% crystalline.

12. The composite adsorbent as claimed in claim 8 wherein the sodium Y zeolite particles have an average particle size of about 3–5 microns.

13. The composite adsorbent as claimed in claim 8 wherein the molar ratio of $SiO_2$ to $Al_2O_3$ in the sodium Y zeolite is about 4.8–6.0.

14. A method for producing a composite adsorbent useful for adsorbing acids and water from used organophosphate functional fluids, said method comprising (a) sizing alumina to an average particle size of about 10 microns or less, (b) agglomerating the alumina particles in the presence of water with Y zeolite particles having an average particle size of less than about 10 microns, said particles comprising Y zeolite wherein the molar ratio of $SiO_2$ to $Al_2O_3$ is about 4.5–6.0, thereby to form a composite agglomerate comprising about 40–90 wt % alumina and about 10–60 wt % Y zeolite, (c) aging the composite agglomerate in the presence of water at pH greater than 7 and at a temperature not greater than about 60° C., (d) activating the composite agglomerate by exposure to an elevated temperature of about 425°–480° C., and (e) comminuting said agglomerate to form a powder having an average particle size of about 20–500 microns.

15. The method as claimed in claim 14 further comprising prior to step (b)

(f) rapidly activating the sized alumina particles by exposure to an elevated temperature of about 300°–1,000° C. for less than one minute, thereby to form activated alumina particles.

16. The method as claimed in claim 14 wherein the composite agglomerate comprises about 50–80 wt % alumina and about 20–50 wt % sodium Y zeolite.

17. The method as claimed in claim 14 wherein the composite agglomerate consists essentially of about 70–80 wt % alumina and about 20–30 wt % sodium Y zeolite.

* * * * *

UNITED STATES PATENT AND TRADEMARK OFFICE
CERTIFICATE OF CORRECTION

PATENT NO. : 4,751,211
DATED : June 14, 1988
INVENTOR(S) : Hubert L. Fleming

It is certified that error appears in the above-identified patent and that said Letters Patent is hereby corrected as shown below:

Table I, Col. 5, line 20    Replace Table I with the following:

TABLE I

Typical Adsorbent Physical Properties

|  | Composite Adsorbent | F-1 Alumina |
|---|---|---|
| Surface Area ($m^2/g$) | 420 | 250 |
| Total Pore Volume ($cm^3/g$) | 0.70 | 0.30 |
| Micropore Volume ($cm^3/g$) (<30 Angstroms) | 0.10 | 0.18 |
| Macropore Volume ($cm^3/g$) (>30 Angstroms) | 0.60 | 0.12 |

UNITED STATES PATENT AND TRADEMARK OFFICE
CERTIFICATE OF CORRECTION

PATENT NO. : 4,751,211

DATED : June 14, 1988

INVENTOR(S) : Hubert L. Fleming

It is certified that error appears in the above-identified patent and that said Letters Patent is hereby corrected as shown below:

| | | |
|---|---|---|
| Crushing Strength (lb) | 16.0 | 8.0 |
| Abrasion Loss (wt%) | 0.1 | 1.5 |
| Optimum Size Cut (48-100 mesh) | > 97 wt% | > 94 wt% |

Signed and Sealed this

Eighth Day of November, 1988

Attest:

DONALD J. QUIGG

Attesting Officer

Commissioner of Patents and Trademarks